US012430358B2

(12) United States Patent
Chandrashekhara et al.

(10) Patent No.: US 12,430,358 B2
(45) Date of Patent: Sep. 30, 2025

(54) SUB-TRACK GRANULARITY FOR PRESERVING POINT-IN-TIME DATA

(71) Applicant: Dell Products L.P., Round Rock, TX (US)

(72) Inventors: Sandeep Chandrashekhara, Shrewsbury, MA (US); Michael Ferrari, Douglas, MA (US); Deepak Vokaliga, Hopkinton, MA (US)

(73) Assignee: Dell Products L.P., Round Rock, TX (US)

( * ) Notice: Subject to any disclaimer, the term of this patent is extended or adjusted under 35 U.S.C. 154(b) by 34 days.

(21) Appl. No.: 18/309,045

(22) Filed: Apr. 28, 2023

(65) Prior Publication Data

US 2024/0362250 A1 Oct. 31, 2024

(51) Int. Cl.
G06F 16/22 (2019.01)
G06F 16/11 (2019.01)
G06F 16/27 (2019.01)

(52) U.S. Cl.
CPC ............ G06F 16/27 (2019.01); G06F 16/128 (2019.01); G06F 16/2237 (2019.01)

(58) Field of Classification Search
CPC ..... G06F 16/27; G06F 16/2237; G06F 16/128
See application file for complete search history.

(56) References Cited

U.S. PATENT DOCUMENTS

| 9,965,216 | B1* | 5/2018 | Jaganathan | G06F 3/0689 |
| 10,942,852 | B1* | 3/2021 | Tian | G06F 12/0868 |
| 2005/0172301 | A1* | 8/2005 | Sollich | G06F 8/24 719/315 |
| 2006/0195674 | A1* | 8/2006 | Arndt | G06F 9/45537 711/173 |
| 2007/0198605 | A1* | 8/2007 | Saika | G06F 16/128 |
| 2013/0226931 | A1* | 8/2013 | Hazel | G06F 16/134 707/752 |
| 2013/0227693 | A1* | 8/2013 | Dewey | G06F 21/577 726/25 |
| 2021/0157677 | A1* | 5/2021 | Vokaliga | G06F 11/1451 |
| 2021/0286535 | A1* | 9/2021 | Aldred | G06F 11/3442 |
| 2022/0121374 | A1* | 4/2022 | Chandrashekhara | G06F 3/0653 |

* cited by examiner

Primary Examiner — Vaishali Shah
(74) Attorney, Agent, or Firm — Daly, Crowley, Mofford & Durkee, LLP

(57) ABSTRACT

A method for reconstituting a data storage unit of a volume, the method comprising: initializing a reconstituted data storage unit that includes a plurality of portions; identifying a first type-1 data structure that corresponds to the data storage unit and a first snapshot of the volume, the first snapshot being created at a first point-in-time, the first type-1 data structure including a first bitmap, the first bitmap including a first plurality of bits, each of the first plurality of bits corresponding to a different portion of the data storage unit; retrieving, from the first snapshot, one or more portions of the data storage unit that correspond to bits in the first bitmap that are set, and storing the portions that are retrieved from the first snapshot in the reconstituted data storage unit; and returning the reconstituted data storage unit.

18 Claims, 11 Drawing Sheets

[702]

[704]

[706]

[708]

SUB-TRACK GRANULARITY FOR PRESERVING POINT-IN-TIME DATA

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a method is provided for reconstituting a data storage unit of a volume, the method comprising: initializing a reconstituted data storage unit that includes a plurality of portions; identifying a first type-1 data structure that corresponds to the data storage unit and a first snapshot of the volume, the first snapshot being created at a first point-in-time, the first type-1 data structure including a first bitmap, the first bitmap including a first plurality of bits, each of the first plurality of bits corresponding to a different portion of the data storage unit; retrieving, from the first snapshot, one or more portions of the data storage unit that correspond to bits in the first bitmap that are set, and storing the portions that are retrieved from the first snapshot in the reconstituted data storage unit; retrieving one or more additional portions of the data storage unit that correspond to bits in the first bitmap that are not are set, and storing the one or more additional portions in the reconstituted data storage unit, each of the one or more additional portions being retrieved from either the volume itself or a snapshot of the volume that is more recent than the first snapshot; and returning the reconstituted data storage unit after the reconstituted data storage unit is complete, wherein the reconstituted data storage unit is complete when each of the plurality of portions of the reconstituted data storage unit is written with data that is obtained from either a snapshot of the volume or the volume itself.

According to aspects of the disclosure, a system is provided comprising: a memory; and at least one processor that is operatively coupled to the memory, the at least one processor being configured to perform the operations of: initializing a reconstituted data storage unit that includes a plurality of portions; identifying a first type-1 data structure that corresponds to a data storage unit in a volume and a first snapshot of the volume, the first snapshot being created at a first point-in-time, the first type-1 data structure including a first bitmap, the first bitmap including a first plurality of bits, each of the first plurality of bits corresponding to a different portion of the data storage unit; retrieving, from the first snapshot, one or more portions of the data storage unit that correspond to bits in the first bitmap that are set, and storing the portions that are retrieved from the first snapshot in the reconstituted data storage unit; retrieving one or more additional portions of the data storage unit that correspond to bits in the first bitmap that are not are set, and storing the one or more additional portions in the reconstituted data storage unit, each of the one or more additional portions being retrieved from either the volume itself or a snapshot of the volume that is more recent than the first snapshot; and returning the reconstituted data storage unit after the reconstituted data storage unit is complete, wherein the reconstituted data storage unit is complete when each of the plurality of portions of the reconstituted data storage unit is written with data that is obtained from either a snapshot of the volume or the volume itself.

According to aspects of the disclosure, a non-transitory computer-readable medium storing one or more processor-executable instructions, which, when executed by at least one processor, cause the at least one processor to perform the operations of: initializing a reconstituted data storage unit that includes a plurality of portions; identifying a first type-1 data structure that corresponds to a data storage unit in a volume and a first snapshot of the volume, the first snapshot being created at a first point-in-time, the first type-1 data structure including a first bitmap, the first bitmap including a first plurality of bits, each of the first plurality of bits corresponding to a different portion of the data storage unit; retrieving, from the first snapshot, one or more portions of the data storage unit that correspond to bits in the first bitmap that are set, and storing the portions that are retrieved from the first snapshot in the reconstituted data storage unit; retrieving one or more additional portions of the data storage unit that correspond to bits in the first bitmap that are not are set, and storing the one or more additional portions in the reconstituted data storage unit, each of the one or more additional portions being retrieved from either the volume itself or a snapshot of the volume that is more recent than the first snapshot; and returning the reconstituted data storage unit after the reconstituted data storage unit is complete, wherein the reconstituted data storage unit is complete when each of the plurality of portions of the reconstituted data storage unit is written with data that is obtained from either a snapshot of the volume or the volume itself.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

DETAILED DESCRIPTION

Figure 1:
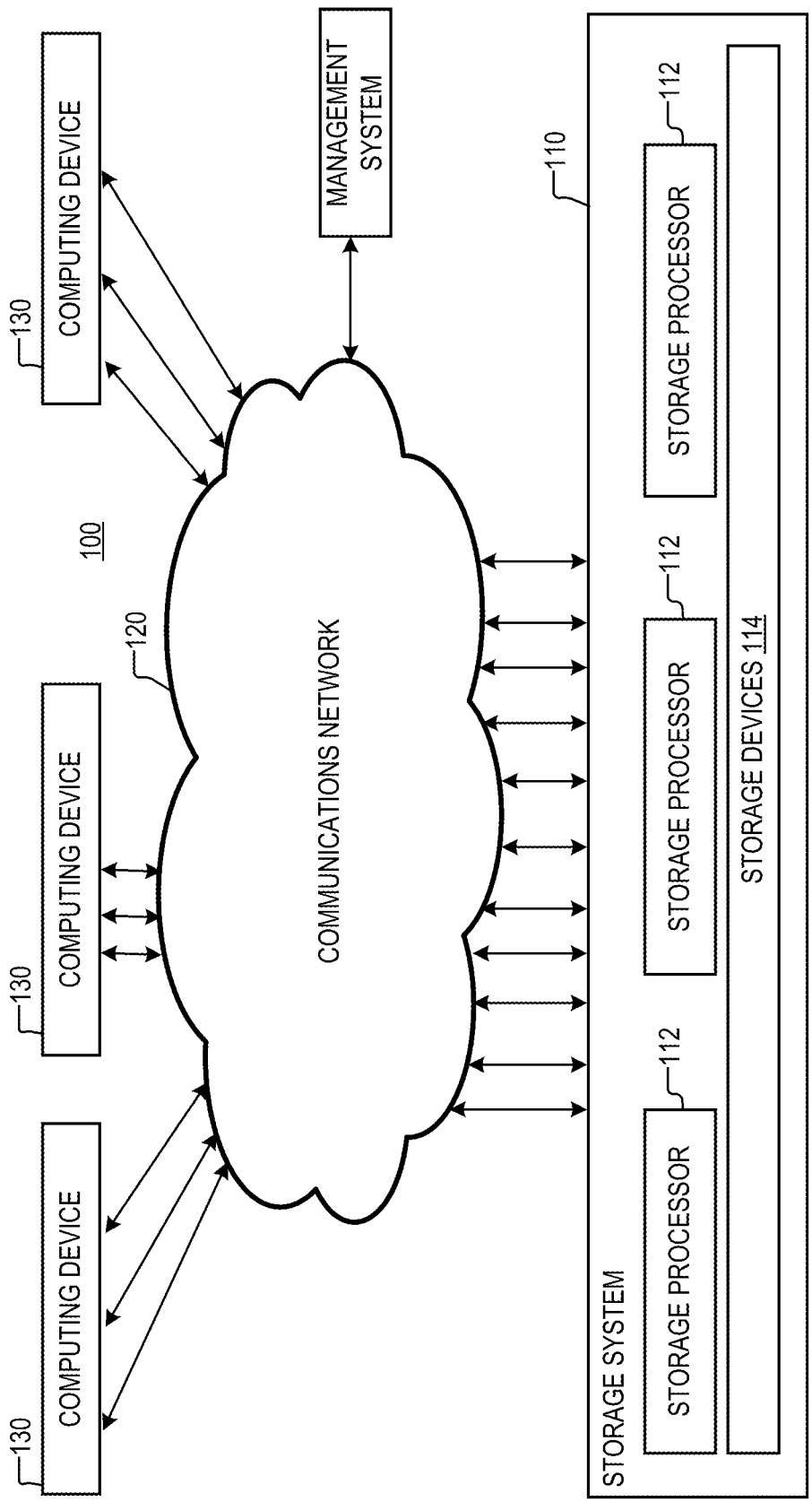
FIG. 1 is a diagram of an example of a system, according to aspects of the disclosure.

FIG. 1 is a diagram of an example of a system 100, according to aspects of the disclosure. As illustrated, the system 100 may include a storage system 110, a communications network 120, and a plurality of computing devices 130. The communications network 120 may include one or more of a fibre channel (FC) network, the Internet, a local area network (LAN), a wide area network (WAN), and/or any other suitable type of network. The storage system 110 may include a storage system, such as DELL/EMC Powermax™, DELL PowerStore™, and/or any other suitable type of storage system. The storage system 110 may include a plurality of storage processors 112 and a plurality of storage devices 114. Each of the storage processors 112 may include a computing device, such as the computing device 800, which is discussed further below with respect to FIG. 8. Each of the storage processors 112 may be configured to receive I/O requests from computing devices 130 and execute the received I/O requests by reading and/or writing data to storage devices 114. Each of the storage devices 114 may include one or more of a solid-state drive (SSD), a hard disk (HD), a non-volatile random-access memory (NVRam) device, a non-volatile memory express (NVMe) device, and/or any other suitable type of storage device. Each computing device 130 may include a laptop computer, a desktop computer, an Internet-of-things (IoT) device, and/or any other suitable type of computing device that might read or write data to the storage system 110. The storage processors 112 may be connected to the management system via one or more of a fibre channel (FC) network, the Internet, a local area network (LAN), a wide area network (WAN), and/or any other suitable type of network.

Figure 2:
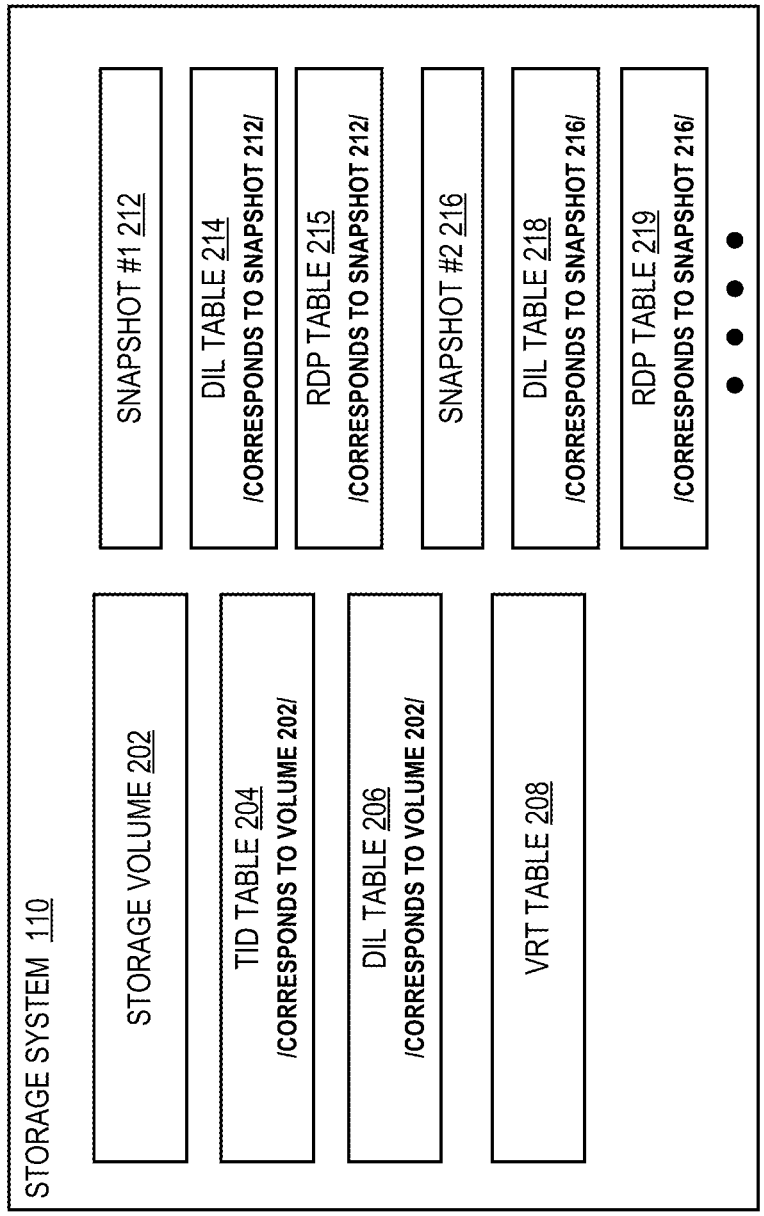
FIG. 2 is a diagram of an example of a storage system, according to aspects of the disclosure.

FIG. 2 is a diagram illustrating aspects of the operation of the storage system 110, according to aspects of the disclosure. As illustrated, the storage system 110 may be arranged to implement a storage volume 202. In addition, the storage system may implement a Track ID (TID) table for the volume 202, a Direct Image Look-up (DIL) table 206 for the volume 202, and a virtual reference table (VRT) table 208. The TID table 204 may map each of a plurality of track offsets in the volume 202 to a different respective physical location in one of the storage devices 114 (and/or a RAID array that is implemented with the storage devices 114) where the track is stored. The term "track" as used herein refers to a data storage unit. According to the present disclosure, a track in the volume 202 includes 128 KB and it consists of four 32 KB pages. However, the present disclosure is not limited to any specific size of a track. According to the present example, a track is a unit that is used in the management of snapshots of the volume 202. However, the present disclosure is not limited to any specific use of the tracks.

The DIL table 206 may include a plurality of DIL entries. Each DIL entry in DIL table 206 may be configured to map a different one of the plurality of track offsets in the volume 202 to a respective VRT entry in the VRT table 208. Or put differently, each DIL entry in the DIL table 206 may contain a pointer to a respective VRT entry. As used herein, the term "DIL table" refers to a plurality of DIL entries. The use of this term is not intended to imply that the plurality DIL entries are encapsulated together and/or any particular structure for the DIL table 206.

The VRT table 208 may include a plurality of VRT entries. Each VRT entry may include a respective counter and a pointer. The counter may serve as an identifier of the VRT entry. The pointer may point either to an RDP entry that is associated with a particular snapshot of volume 202 or it may point directly to the volume 202. As used herein, the term "VRT table" refers to a plurality of VRT entries. The use of this term is not intended to imply that the plurality VRT entries are encapsulated together and/or encapsulated in any particular structure for the DIL table 206.

The storage system 110 may further include a snapshot 212 of the volume 202, a DIL table 214 that is associated with the snapshot 212, and an RDP table 215 that is associated with the snapshot 212. The DIL table 214 may map the tracks in the volume 302 to the respective locations in the physical storage of the snapshot 212 where the tracks are stored. The difference between the DIL table 206 and the DIL table 214 is that the DIL table 206 points to the physical locations where the tracks in the volume 202 are stored, whereas the DIL table 214 points to the physical locations where snapshots of the volume tracks are kept. Under the nomenclature of the present disclosure, the snapshots of each of the tracks in the volume 202 form a snapshot of the volume 202. The DIL table 214 may include a plurality of DIL entries, wherein each of the DIL entries maps a different track identifier to a corresponding location where a snapshot of the track (identified by the track identifier) is stored. Specifically, each of the DIL entries may include a pointer to a corresponding VRT entry, the corresponding VRT entry may include a pointer to an RDP entry (in RDP table 215), and the RDP entry may include a pointer to the physical location where a snapshot of the track is stored. The RDP table 215 may include a plurality of RDP entries. Each of the RDP entries may be associated with a different track snapshot (or copy) in snapshot 212. An example of the structure and use of the RDP entries is discussed further below with respect to FIGS. 3A-7.

The storage system 110 may further include a snapshot 216 of the volume 202, a DIL table 218 that is associated with the snapshot 216, and an RDP table 219 that is associated with the snapshot 216. The DIL table 218 may map the tracks in the volume to the respective locations in the physical storage of the snapshot 216 where the tracks are stored. The difference between the DIL table 206 and the DIL table 218 is that the DIL table 206 points to the physical locations where the tracks in the volume 202 are stored, whereas the DIL table 218 points to the physical locations where snapshots of the volume tracks are kept. The DIL table 218 may include a plurality of entries, wherein each of the entries maps a different track identifier to a corresponding location where a snapshot of the track (identified by the track identifier) is stored. Specifically, each of the DIL entries may include a pointer to a corresponding VRT entry, the corresponding VRT entry may include a pointer to an RDP entry (in RDP table 215), and the RDP entry may include a pointer to the physical location where a snapshot of the track is stored. The RDP table 219 may include a plurality of RDP entries. Each of the RDP entries may be associated with a different snapshot track in snapshot 216. An example of the structure and use of the RDP entries is discussed further below with respect to FIGS. 3A-7.

Although the DIL tables 206, 214, and 218 are depicted as separate entities, alternative implementations are possible in which they are integrated with each other (fully or partially). In this regard, it will be understood that the present disclosure is not limited to any specific implementation of the DIL tables 206, 214, and 218. Although the RDP tables 215 and 219 are depicted as separate entities, it will be understood that alternative implementations are possible in which they are integrated with each other (fully or partially). In this regard, it will be understood that the present disclosure is not limited to any specific implementation of the RDP tables 215 and 219. Although FIG. 2 shows only two snapshots of the volume 202, it will be understood that storage system 110 may be configured to store any number of snapshots. In some respects, FIG. 2 is provided to illustrate that each of the snapshots of the volume 202 may be associated with a different respective set of DIL entries and RDP entries, irrespective of whether the DIL entries and RDP are organized in different tables, in a single table, or in any other manner.

Figure 3A:
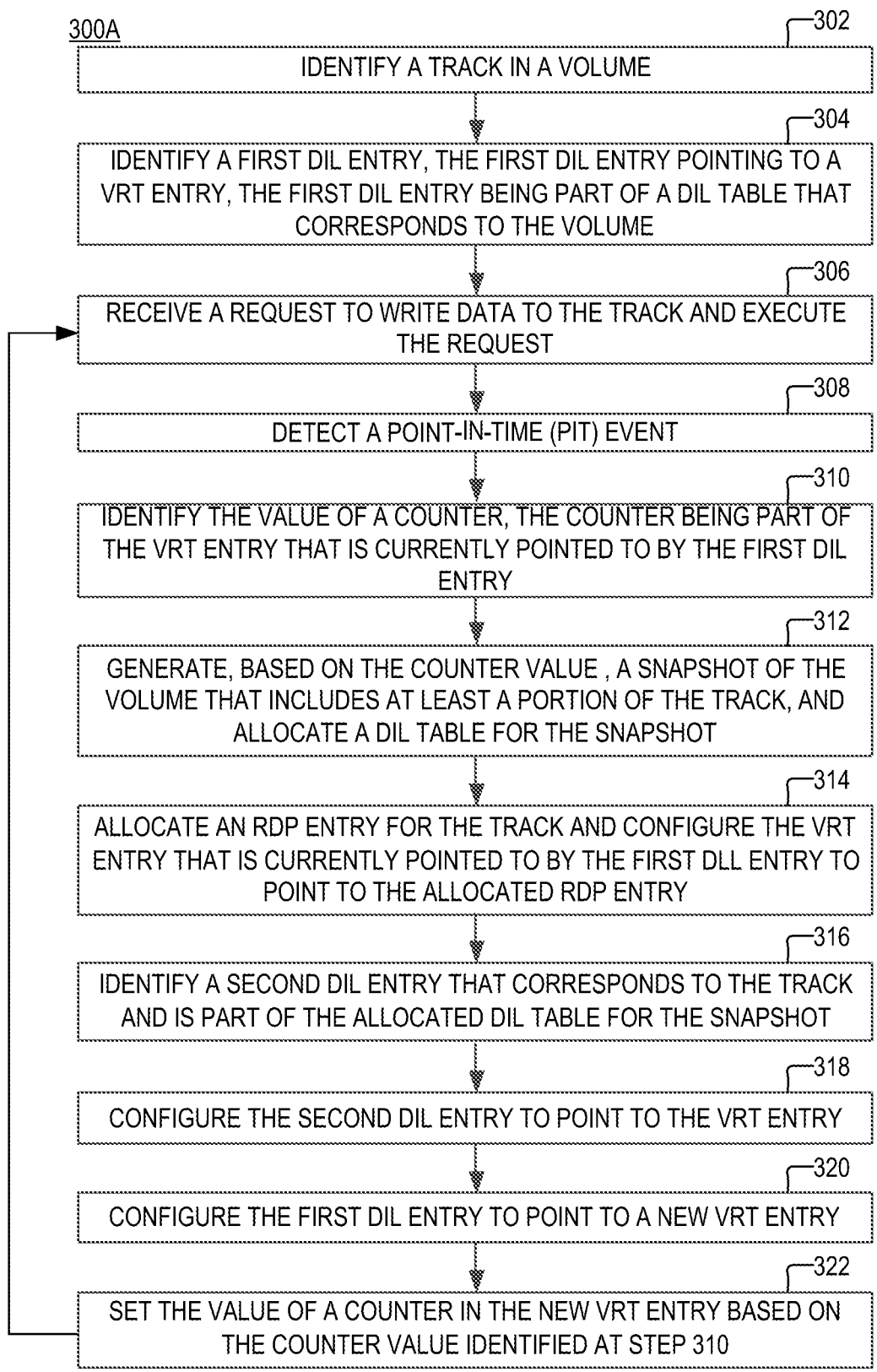
FIG. 3A is a flowchart of an example of a process, according to aspects of the disclosure.

FIG. 3A is a flowchart of an example of a process 300, according to aspects of the disclosure. At step 302, a track in the volume 202 is identified. At step 304, a first DIL entry is identified in the DIL table 206 that corresponds to the track. The identified DIL entry may include a pointer to a first VRT entry. The first VRT entry may be currently pointing to the volume 202, or more particularly, to the location in the volume 202 (or physical location) where the track is stored. At step 306, a request to write data to the track is received and executed. At step 308, a point-in-time (PiT) event is detected. The PiT event may be generated as a result of a timer expiring and/or in any other suitable manner. At step 310, the value of a counter is identified. The counter is part of the first VRT entry. At step 312, snapshot 212 of volume 202 is generated. In the present example, the snapshot 212 is generated based on the counter value (identified at step 310), meaning that the name or another identifier of the snapshot 212 is set to equal or otherwise include the counter value. In the present example, the counter value is used to denote the sequencing of snapshots of the volume 202 that are being taken. At step 314, an RDP entry is allocated for the track (identified at step 302). Afterwards, a pointer to the allocated RDP entry is inserted into the first VRT entry, and the first VRT is thus configured to point to the allocated RDP entry, rather than volume 202. The allocated RDP entry may be the same or similar to the RDP entry 500, which is discussed further below with respect to FIG. 5. At step 316, a second DIL entry is identified, which corresponds to the track (identified at step 302). The second DIL entry is part of a DIL table that corresponds to the snapshot (created at step 312). In the present example, the second DIL entry is part of DIL table 214. At step 318, a pointer to the first VRT entry is inserted in the second DIL entry, and the second DIL entry is thus configured to point to the first VRT entry. At step 320, a pointer to a second VRT entry is inserted in the first DIL entry, and the first DIL entry is thus configured to point to the second VRT entry. The second VRT entry may be configured to point 202 and/or the (physical) location where the track is stored. At step 322, a counter of the second VRT entry is set based on the counter of the first VRT entry (identified at step 310). Specifically, the counter in the second VRT entry may be set to equal to a value that is greater by one than the value identified at step 310.

FIG. 3A is provided to illustrate that each track in the volume 202 is mapped to a respective VRT entry, and, when a snapshot of the volume is created, an RDP entry for the track is allocated, while the VRT entry is configured to point to the RDP entry. When the new snapshot is created, only data that is written to the track since the creation of the last snapshot is placed in the new snapshot. As is discussed further below, the RDP entry that is allocated for the track includes a bitmap that shows where the new data belongs in the track. For example, the bitmap may identify specific pages in the track where the new data was written.

The first VRT entry in this example is provided to add a layer of indirection between the offset of the track, which is contained in the first DIL entry and the RDP entry for the track (allocated at step 302). This permits multiple DIL entries (for different tracks) to point to the RDP entry which may be useful when the storage system 110 is a content-addressable system. However, it will be understood that when the storage system 110 is a location addressable system, the first VRT entry may be omitted, and the counter and pointer values that are currently stored in the first VRT entry may be moved to the first DIL entry. Similarly, when the storage system 110 is a location addressable system, the first VRT entry may also be omitted and the pointer to the RDP entry (allocated at step 314) may be moved into the second DIL entry.

In another respect, FIG. 3A illustrates aspects of the metadata processing that takes place for each track in the volume 202 when a snapshot of the volume 202 is created. It will be understood that when a snapshot of the volume 202 is taken, steps 302-310 and 314-322 may be performed for each track of the volume. The sequence identifier of the snapshot may be obtained based on the counter value in any of the VRT entries that are currently pointed to by the DIL entries in the DIL table 206.

Figure 3B:
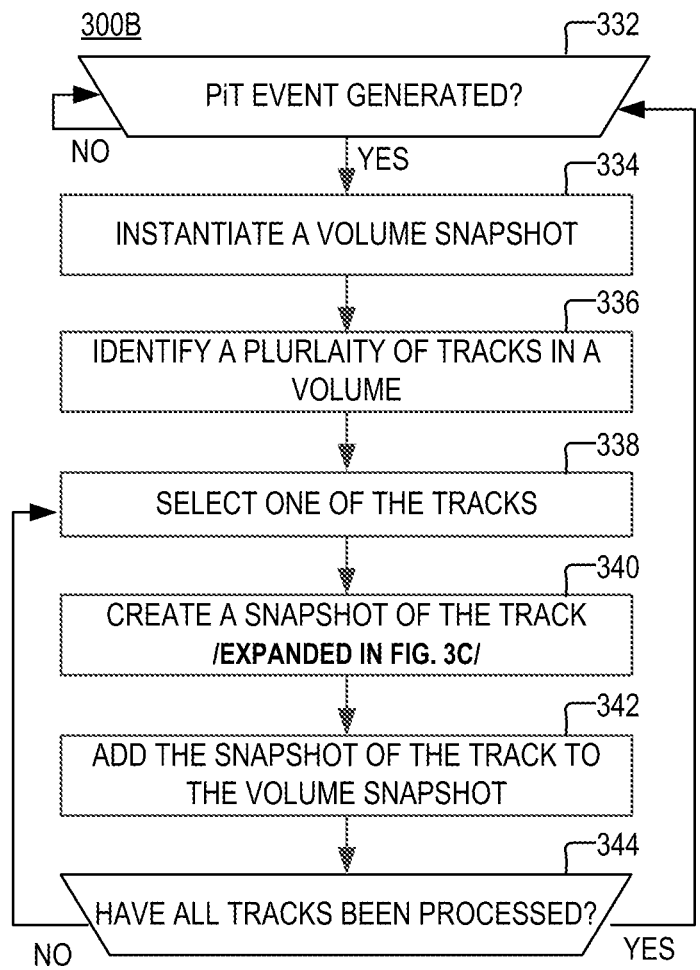
FIG. 3B is a flowchart of an example of a process, according to aspects of the disclosure.

FIG. 3B is a flowchart of an example of a process 300B, according to aspects of the disclosure.

At step 332, a determination is made if a PiT event is generated. The PiT event may be generated when a particular point-in-time is reached. If a PiT event is generated, the process 300B proceeds to step 334. Otherwise, step 332 is repeated. Under the nomenclature of the present disclosure, the PiT event detected at step 332 is referred to as a "current PiT event". The PiT event generated immediately before the current PiT event is referred to as "a previous PiT event". For example, if the storage system 110 is set to generate a PiT event every 12 hours, and the current PIT event is generated at 23:59, the previous PiT event would be generated at 11:59 on the same day. The period starting at the previous PiT event and ending at the current PiT event is referred to as "the current PiT period".

At step 334, a blank snapshot of the volume 202 is instantiated. At step 336, a plurality of tracks of the volume 202 is identified. At step 338, one of the identified tracks is selected. At step 340, a snapshot of the track is created. According to the present example, the snapshot is created in accordance with a process 300C, which is discussed further below with respect to FIG. 3C. At step 342, the snapshot of the track is added to the volume snapshot (instantiated at step 334). At step 344, a determination is made if all tracks are processed. If not all tracks have been processed, the process 300B returns to step 338, and steps 338-342 are repeated for another track in the volume 202. If all tracks have been processed, the process 300B returns to step 332.

Figure 3C:
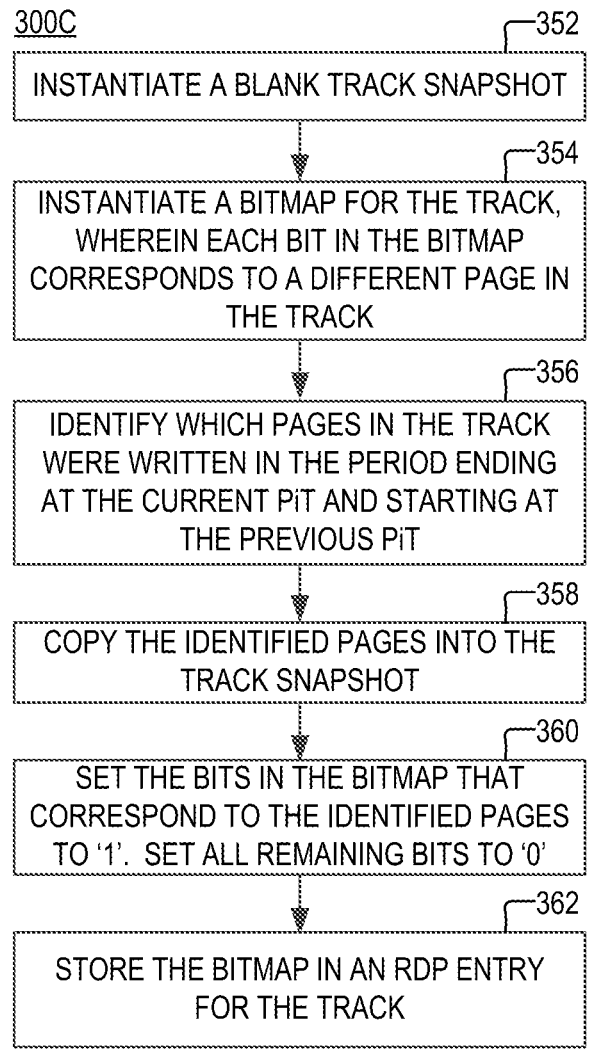
FIG. 3C is a flowchart of an example of a process, according to aspects of the disclosure.

FIG. 3C is a flowchart of an example of a process 300C for generating a track snapshot, as specified at step 340 of the process 300B.

At step 352, a track snapshot is instantiated. Instantiating the track snapshot may include reserving or allocating a memory space where the track data is going to be stored. Additionally or alternatively, in some implementations, instantiating the track snapshot may include instantiating a data structure that would hold the track data.

At step 354, a bitmap is instantiated. Instantiating the bitmap may include reserving or allocating memory that would hold the bitmap data or instantiating a data structure that would hold the bitmap data. The bitmap may include a plurality of bits. Each bit may correspond to a different one of the pages in the track whose snapshot is being created. The bitmap may include as many bits as there are pages in the track.

At step 356, one or more pages in the track are identified, if any, that were written during the current PiT period.

At step 358, the identified pages are copied into the track snapshot. Pages in the track that have not changed during the track period are not copied into the track snapshot. As can be readily appreciated, this approach is advantageous because it reduces the storage footprint of the track snapshot and results in savings of storage space.

At step 360, bits in the bitmap that correspond to the identified pages are set to '1'. All remaining bits are set to '0'. As noted above, the snapshot of the track may include fewer than all pages that are present in the track. In this regard, the bitmap may be used to determine which pages of the track exactly are contained in the track snapshot.

At step 362, the bitmap is stored in an RDP entry that corresponds to the track. (E.g., the RDP entry discussed with respect to step 314 of the process 300A.)

The example of FIG. 3C assumes that at least one page in the track has changed during the current PiT period. However, it is also possible that the track is not written to at all during the current PiT period. If no data is written to the track during the current PiT period, no data from the track would be copied into a track snapshot and/or the volume snapshot for volume 202. However, an RDP entry for the track would still be created, which contains a bitmap that is all zeroes. As is discussed further below with respect to FIG. 8, the bitmap may indicate that no data for the track needs to be retrieved from the snapshot (created as a result of executing process 300B) when the volume 202 is being reconstituted based on the snapshot. Although, in the example of FIG. 3C, the RDP entry and the bitmap are created at different steps, it will be understood that they may be created in a single step.

Figure 4A:
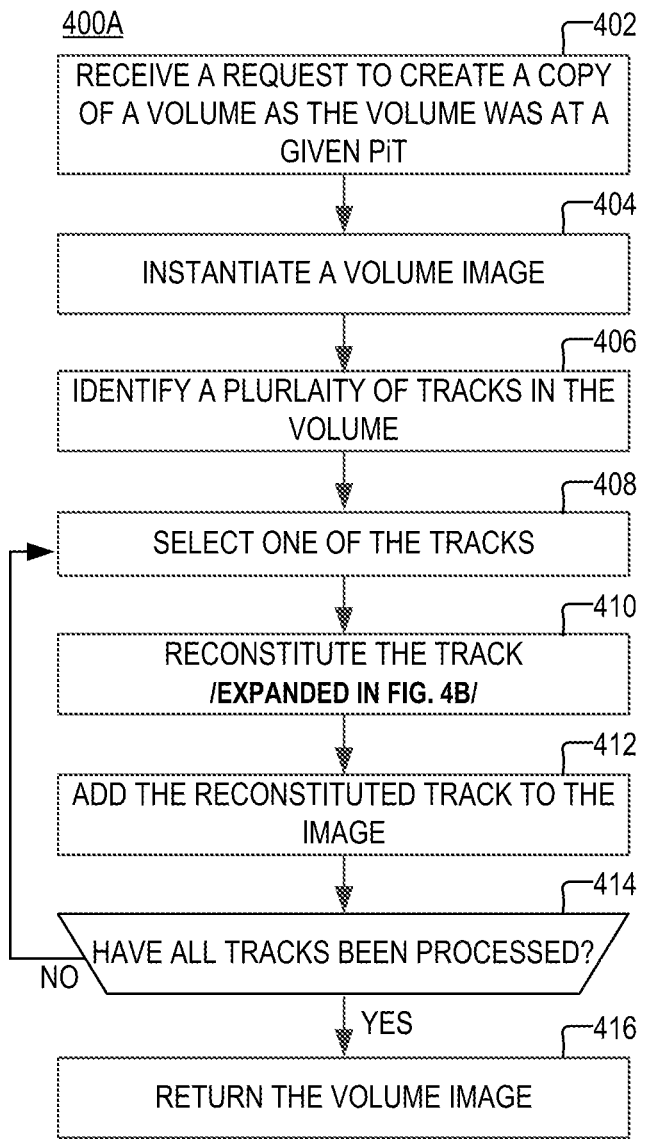
FIG. 4A is a flowchart of an example of a process, according to aspects of the disclosure.

FIG. 4A is a process 400A according to aspects of the disclosure. At step 402, a request is received to create a copy of the volume 202 as the volume was at a given PiT. In other words, a request is received to restore the state of the volume 202 at the given PiT. At step 404, a volume image is instantiated. At step 406, a plurality of tracks (e.g., all tracks) that are part of the volume is identified. At step 408, one of the tracks (identified at step 406) is selected. The selected track may be one that has not been selected during a previous iteration of steps 408-412. At step 410, the selected track is reconstituted. The selected track may be executed in accordance with the process 400B, which is discussed further below with respect to FIG. 4B. At step 412, the reconstituted track is added to the volume image. At step 414, a determination is made if all tracks in the plurality (identified at step 406) have been processed. If all tracks have been processed, the process 400A proceeds to step 406. Otherwise, the process 400A returns to step 408, and steps 408-412 are repeated for another track in the plurality. At step 416, the volume image is returned.

Figure 4B:
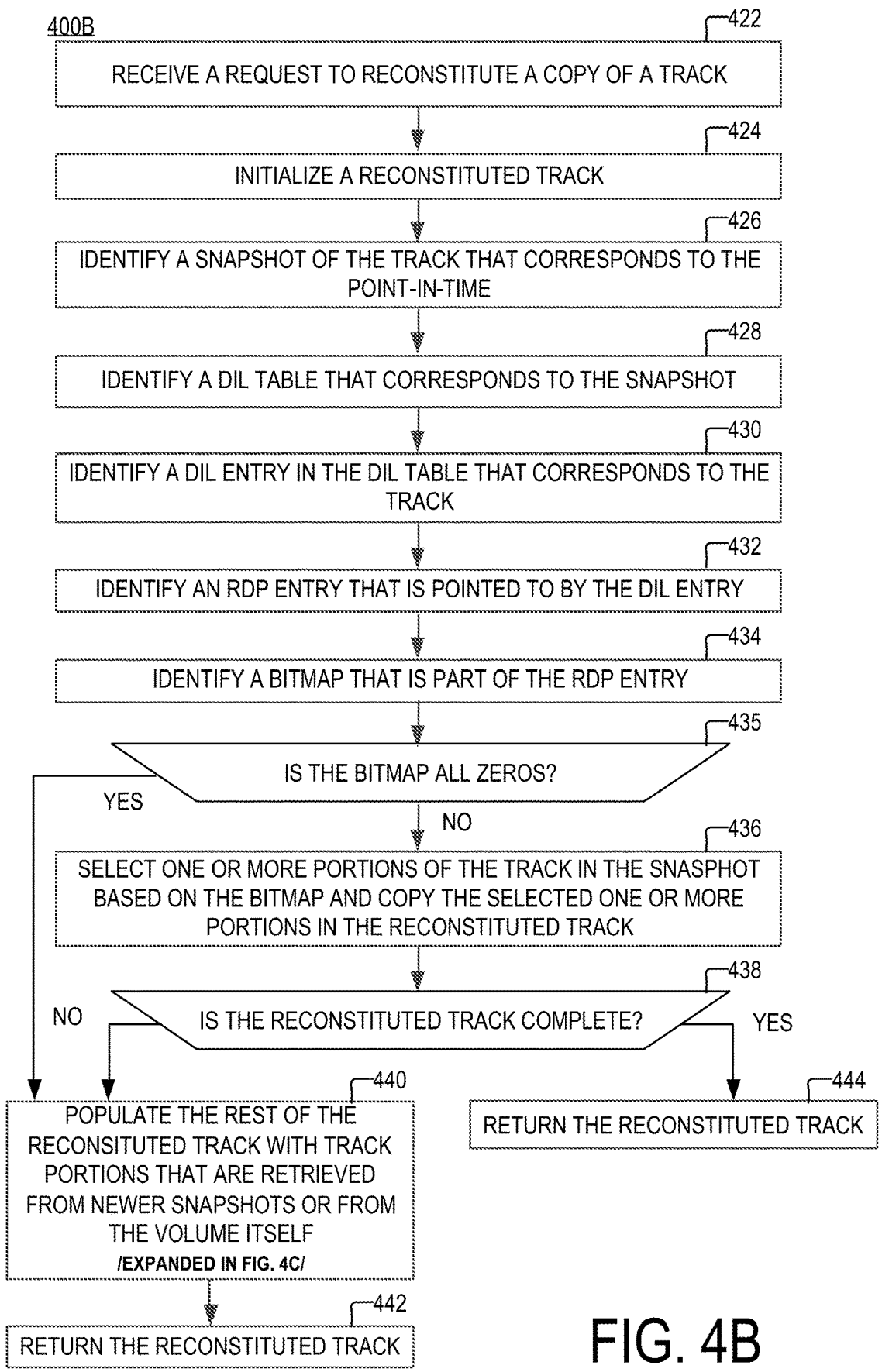
FIG. 4B is a flowchart of an example of a process, according to aspects of the disclosure.

FIG. 4B is a flowchart of an example of a process 400B for reconstituting a volume track, as specified by step 410 of the process 400A, according to aspects of the disclosure.

At step 422, a request is received to reconstitute a track
At step 424, a reconstituted track is uninitialized. In some implementations, initializing the reconstituted track may include reserving or allocating a memory space where the track data is going to be stored. Additionally or alternatively, initializing the reconstituted track may include instantiating an object representing the reconstituted track.

At step 426, a snapshot of the volume 202 is identified that corresponds to the given PiT (discussed with respect to step 402 of process 400A). The identified snapshot may be one that was created at the given PiT.

At step 428, a DIL table is identified that corresponds to the snapshot. As noted above, the DIL table that corresponds to the snapshot may include a plurality of entries, wherein each entry maps (directly or indirectly) a different track offset to a location in physical storage where a copy (or snapshot) of the track is stored.

At step 430, a DIL entry is identified that is part of the DIL table (identified at step 428), which corresponds to the track. According to the present example, a DIL entry is identified that includes the offset of the track and points to an RDP structure corresponding to a snapshot of the track that is part of the volume snapshot (identified at step 426).

At step 432, an RDP entry is identified that is pointed to by the DIL entry (identified at step 432). According to the present example, identifying the RDP entry includes retrieving an pointer to a VRT from the DIL entry (identified at step 430), and retrieving from the VRT entry a pointer to the RDP entry.

At step 434, a bitmap is identified that is part of the RDP entry. Identifying the bitmap may include retrieving the bitmap from the RDP entry.

At step 435, a determination is made if the bitmap contains all zeros. If the bitmap contains all zeros, the process 400B proceeds to step 440. Otherwise, the process 400B proceeds to step 436.

At step 436, one or more portions of the track snapshot (identified at step 304) are identified based on the bitmap. Specifically, at step 436, the bitmap is used to identify pages of tracks that are currently present in the snapshot. Those pages would correspond to bits in the bitmap that are set to '1'. After the pages are identified, the identified pages are copied into the reconstituted track (instantiated at step 424). Specifically, at step 436, any bits in the bitmap whose value is '1' are identified. Next, the corresponding page of each of the identified bits is determined. And finally, the contents of each of the identified pages are retrieved from the snapshot and copied into the reconstituted track.

At step 438, a determination is made if the reconstituted track is complete. If all pages in the reconstituted track (initialized at step 424) are populated with data from the snapshot (identified at step 426), the reconstituted track is deemed complete, and the process 400B proceeds to step 424. Otherwise, if not all pages in the reconstituted track are populated with data from the snapshot, the reconstituted track is deemed incomplete, and the process 400B proceeds to step 440.

At step 440, the portions of the reconstituted track that remain to be populated are populated with data (e.g., pages) that are retrieved from newer snapshots (i.e., snapshots that are generated after the snapshot identified at step 426) and/or the volume 202 itself. Step 440 may be performed in accordance with the process 400C, which is discussed further below with respect to FIG. 4C.

Figure 4C:
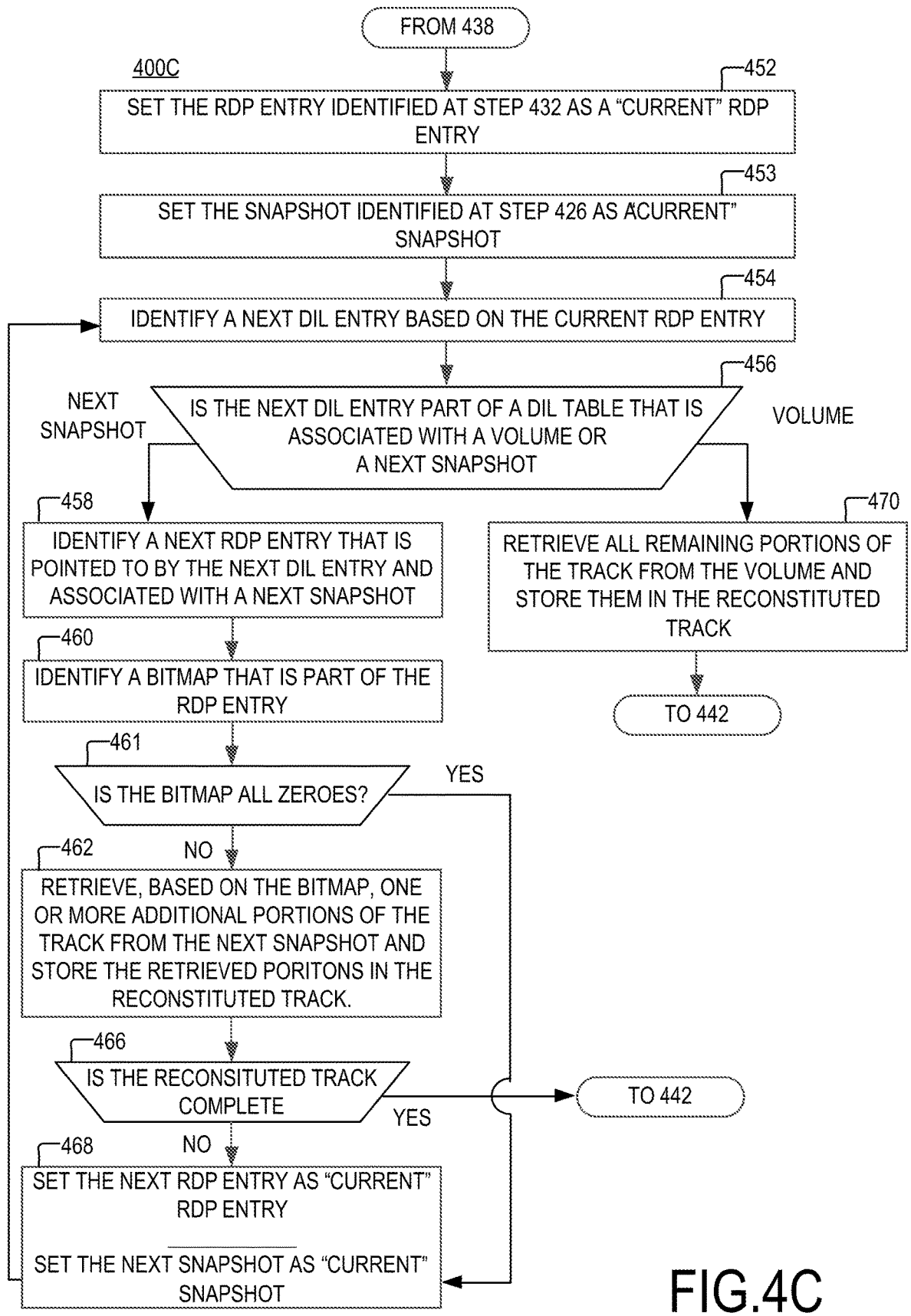
FIG. 4C is a flowchart of an example of a process, according to aspects of the disclosure.

At step 442, the reconstituted snapshot is returned.
At step 444, the reconstituted snapshot is returned.
FIG. 4C is a flowchart of an example of a process for populating a reconstituted track with data, as specified by step 440 of the process 400B.

At step 452, the RDP identified at step 432 is designated a "current" RDP entry.

At step 453 the snapshot identified at step 446 is designated as a "current" snapshot.

At step 454, a next DIL entry is identified based on the current RDP entry. Identifying the next DIL entry may include retrieving a pointer (or another identifier) to the next DIL entry from the current RDP entry. The current RDP entry may be associated with a DIL table that corresponds to the current snapshot. The next the DIL entry may be part of a DIL table that is associated with a next snapshot. The next snapshot may be one that is created immediately after the current snapshot (i.e., at the PiT immediately following the PiT when the current snapshot is generated). Alternatively, the next DIL entry may be part of a DIL table that is associated with the volume 202.

At step 456, a determination is made if the next DIL entry is associated with a next snapshot or the volume. If the next DIL entry is associated with a next snapshot, the process 400C proceeds to step 458. Otherwise, if the DIL is associated with the volume 202, the process 400C proceeds to step 470.

At step 458, an RDP entry is identified that is pointed to (or otherwise referenced) by the next DIL entry. The identified RDP entry is herein referred to as "the next RDP entry". The RDP entry may be identified by retrieving a pointer (or another identifier) to a VRT entry, and retrieving a pointer (or another identifier) to the next RDP entry from the VRT entry. Alternatively, the pointer (or another identifier) may be retrieved directly from the next RDP entry. The next RDP entry may be configured to point to the next snapshot of the track—i.e., the snapshot of the track that is taken at the next PiT and which is part of the next snapshot of volume 202.

At step 460, the bitmap is retrieved from the next RDP entry. The bitmap is herein retrieved to as a "next bitmap".

At step 461, a determination is made if the bitmap contains only zeros. If the bitmap contains only zeroes, the process 400C proceeds to step 468. Otherwise, if the bitmap contains at least one '1', the process 600C proceeds to step 462.

Figure 7:
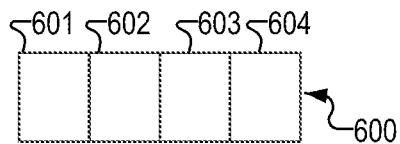
FIG. 7 is a diagram of an example of a process, according to aspects of the disclosure.
Figure 7:
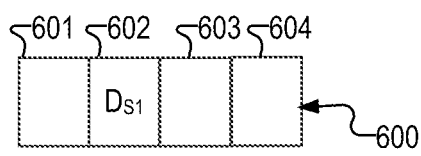
Figure 7:
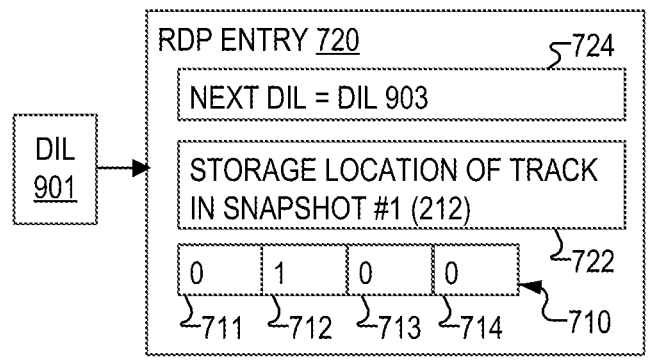
Figure 7:
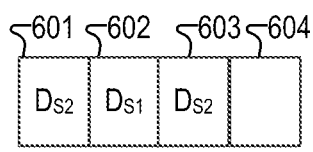
Figure 7:
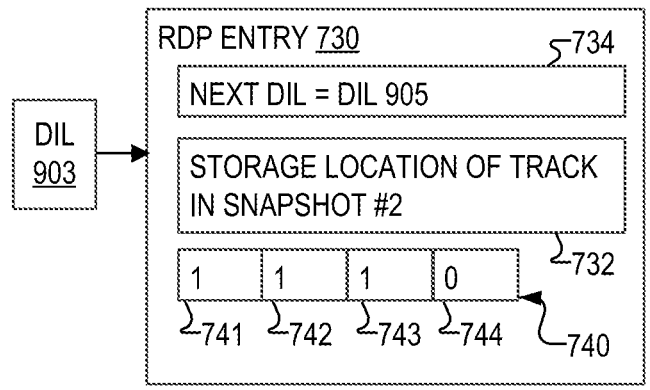
Figure 7:
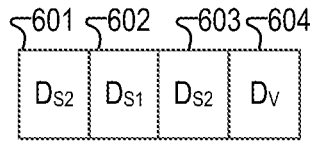
Figure 7:
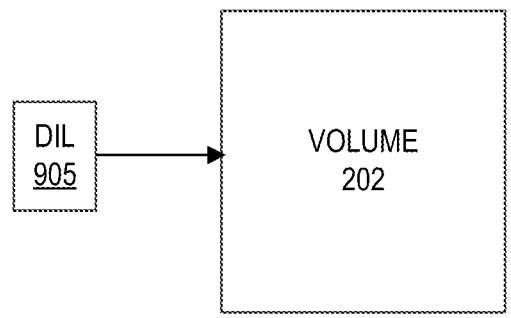

At step 462, one or more additional portions of the track are retrieved from the next snapshot based on the bitmap. Specifically, at step 462, any bits in the bitmap whose value is '1' are identified. Next, the corresponding page of any of the identified bits is determined. And finally, the contents of each of the identified pages are retrieved from the next snapshot and copied into the reconstituted track (initialized at step 424), provided that data for that page has not already been copied from earlier snapshot. FIG. 7, which is discussed further below, illustrates in further detail how the reconstituted track may be populated with data.

At step 466, a determination is made if the reconstituted track is complete. Step 466 may be performed in the same manner as step 438 of the process 400B. If the reconstituted track is complete, the process 400C returns to step 442 of the process 440B. If the reconstituted track is not complete, the process 400B proceeds to step 468.

At step 468, the next RDP entry (identified at step 458) is designated as the "current" RDP entry. In addition, the next snapshot (i.e., the snapshot that is pointed to by the next RDP entry) is designated as the current snapshot. After step 468 is completed, the process 400C returns to step 454.

At step 470, all remaining portions of the track are copied from the volume 202 into the reconstituted track.

Figure 5:
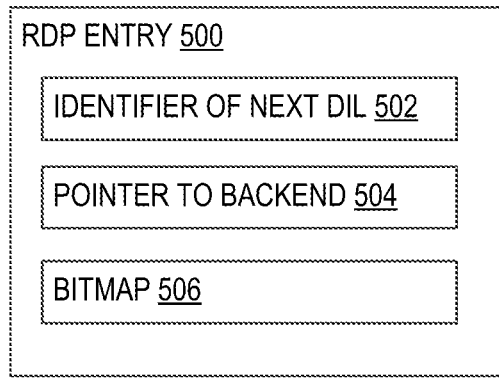
FIG. 5 is a diagram of an example of a replication data pointer (RDP) entry, according to aspects of the disclosure.

FIG. 5 is a diagram of an example of an RDP entry 500, according to aspects of the disclosure. As illustrated the RDP entry may include an identifier 502 of a next DIL, a pointer 504, and a bitmap 506. The RDP entry may be associated with a first snapshot of the volume 202 and/or a track 600 in the volume 202. The identifier 502, may be a pointer to a DIL entry that belongs to a DIL table that is associated with a second snapshot of the volume 202. The second snapshot may be the next consecutive snapshot of the volume 202. The DIL entry may be mapped to a snapshot of the track 600 that is part of the second snapshot and/or another RDP entry that corresponds to the track. The pointer 504 may identify the offset in the first snapshot where the snapshot of the track begins. The bitmap 506 may identify what portions of the track 600 are stored in the first snapshot. If the bitmap 506 is set to all zeroes, this means that no portions of the track are stored in the first snapshot, in which case the pointer 504 may be equal to null.

Figure 6:
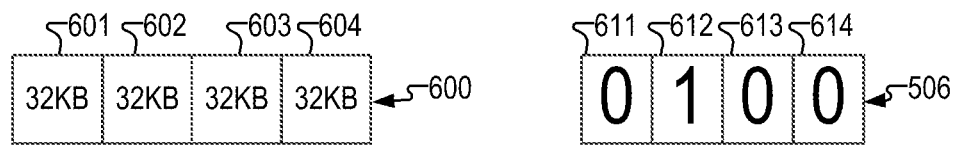
FIG. 6 is a diagram of an example of a data unit and a bitmap, according to aspects of the disclosure.

FIG. 6 is a diagram of an example of the track 600, according to aspects of the disclosure. According to this example, the track 600 includes pages 601, 602, 603, and 604 that are each 32 KB long.

FIG. 6 further shows an example of the bitmap 506, according to aspects of the disclosure. As illustrated the bitmaps may include as many bits as there are pages in the track 600. Each bit in the bitmap may correspond to a different page in the track 600. The value of each bit in the bitmap 506 may indicate whether a copy of the bit's corresponding page is available (or present) in the first snapshot (i.e., the first snapshot discussed with respect to FIG. 5). For example, if a bit is set to '0', this indicates that a copy of the bit's corresponding page is not stored in the first snapshot (because the page wasn't modified in the period starting when the snapshot generated immediately before the first snapshot was created and ending when the first snapshot was created). On the other hand, if the bit is set to '1', this indicates that a copy of the bit's corresponding page is stored in the snapshot (because the page was modified in the period starting when the snapshot generated immediately before the first snapshot was created and ending when the first snapshot was created). In the present example, bit 611 corresponds to page 601, and has a value of '0', which indicates that a copy of page 601 is not present in the first snapshot; bit 612 corresponds to page 602, and has a value of '1', which indicates that a copy of page 602 is present in the first snapshot; bit 613 corresponds to page 603, and has a value of '0', which indicates that a copy of page 603 is not present in the first snapshot; and bit 614 corresponds to page 604, and has a value of '0', which indicates that a copy of page 604 is not present in the first snapshot.

FIG. 7 is a diagram illustrating a process for reconstituting the track 600, according to aspects of the disclosure.

The process 700 may be executed in response to a request to generate an image of the volume 202 which represents the state of the volume at a given point in time. The reconstituted track may be created based on a set of snapshots of the volume 202 and optionally data that is currently present in the volume 202. The set of snapshots may include the snapshot that was generated at the given point in time (hereinafter oldest snapshot), as well as any (at least some or all) snapshots of the volume that are generated after the oldest snapshot. The set of snapshots may not include snapshots that are generated before the snapshot that is generated at the given point in time.

The output of process 700 may be a reconstituted track. Each page in the reconstituted track may be populated with the oldest copy of the page that is available in the set of snapshots. If none of the snapshots in the set contains a copy of the, the page may be populated with data that is retrieved directly from the volume.

At step 702, a blank copy of track copy of track 600 instantiated.

At step 704, a snapshot is identified that is created at the given PiT. In this example, the snapshot 212 is identified. Next, a DIL entry 901 corresponding to the track 600 is identified. The DIL entry 901 may be part of DIL table 214, which is associated with snapshot 212 or it may be otherwise associated with the snapshot 212. Next, the DIL entry 901 is used to identify an RDP entry 720 that is associated with the track 600. The RDP entry may be part of RDP table 215 which is associated with snapshot 212 or it may be otherwise associated with snapshot 212. The RDP entry 720 may be identified by retrieving an identifier of (e.g., a pointer to) the RDP entry 720 from the identified DIL entry 901 or from a VRT entry that is referenced by the DIL entry 901.

The RDP entry 720 may include an identifier 724 of a next DIL 903, an identifier 722 of an offset in the snapshot 212 where the track 600 (i.e., a copy of the track 600) begins, and a bitmap 710. Alternatively or additionally, the identifier 722 may identify the physical location where the copy of track 600 that is part of snapshot 212 is stored. The next DIL 903 may be a DIL entry that is associated with the track 600, which is also associated with the snapshot that is created at the PiT that immediately follows the PIT when the snapshot 212 is created (i.e., the "next snapshot", which is snapshot 216 in this example). Bitmap 710 includes bits 711, 712, 713, and 714. Bit 711 corresponds to page 601, bit 712 corresponds to page 602, bit 713 corresponds to page 603, and bit 714 corresponds to page 604. Bits 711, 713, and 714 are set to '0' and bit 712 is set to '1'. This indicates that snapshot 212 contains only a copy of page 602. Accordingly, at step 704, the bitmap 710 is inspected and a copy of page 602 is copied from snapshot 212 into the copy of track 600 that is instantiated at step 704.

At step 706, the identifier 724 is used to identify the next DIL entry, which in this case is DIL entry 903. DIL entry 903 may be part of DIL table 218 that is associated with snapshot 216 or it may be otherwise associated with the snapshot 216. Next, the DIL entry 903 is used to identify an RDP entry 730. RDP entry 730 may be part of RDP table 219 or it may be otherwise associated with snapshot 216. RDP entry 730 may be identified by retrieving an identifier (or pointer) of the RDP entry 730 from the DIL entry 903 or from a VRT entry that is associated with the DIL entry 903. The RDP entry 730 may contain an identifier 734 of a next DIL entry, an identifier 732 of an offset in the snapshot 216 where the track 600 (or the copy of the track 600) begins, and a bitmap 740. Alternatively or additionally, the identifier 722 may identify the physical location where the copy of track 600 that is part of snapshot 216 is stored.

The next DIL entry 905 may be a DIL entry that is associated with the track 600, which is also associated with the volume 202. Bitmap 740 includes bits 741, 742, 743, and 744. Bit 741 corresponds to page 601, bit 742 corresponds to page 602, bit 743 corresponds to page 603, and bit 744 corresponds to page 604. Bits 741, 742, and 743 are set to '1' and bit 744 is set to '0'. This indicates that snapshot 212 contains copies of pages 601, 602, and 603 only. Accordingly, at step 706, the bitmap 740 is inspected and the data of pages 601 and 603 are copied into the copy of track 600 that is instantiated at step 702. Notably, bits 712 and 742 are both associated with of track 600 from an earlier snapshot (i.e., the snapshot 212), the fact that bit 742 is set to '1' is ignored and the copy of page 602 that is part of snapshot 216 is not brought into the copy of track 600.

At step 708, the identifier 734 is used to identify the next DIL entry, which in this case is DIL entry 905. DIL entry 905 may be part of DIL table 206 and/or it may be otherwise associated with volume 202. Next, DIL entry 905 is examined to determine that DIL entry 905 is associated with the volume 202, rather than being associated with an RDP entry. Next, the copy of track 600 (instantiated at 702) is examined to identify pages that have not yet been populated with data that is taken from one of the snapshots of volume 202. Afterwards, the identified pages are copied from the volume 202 into the copy of track 600 that is instantiated at step 702. After this, the reconstitution of track 600 is completed.

In one aspect, FIG. 7 illustrates that each of the RDP entries that are associated with the track 600 includes an identifier of a next DIL (or a next DIL pointer). These identifiers may be used to traverse a sequence including all snapshots that are created at the given PiT and time and onwards, as well as the volume 202. As the snapshots and volume are being traversed, copies of different pages of track 600 are being brought into the copy of track 600 that is instantiated at page 602.

In another aspect, FIG. 7 illustrates that the bitmap in each RDP entry may be used to determine whether to bring data into the reconstituted track from the RDP entry's corresponding snapshot. Subject to the exceptions discussed above, if a bit is set to '1', the bit's corresponding page may be retrieved by the process 700 from the RDP entry's respective snapshot and copied into the reconstituted track 600. On the other hand, if the bit is set '0', the bit's corresponding page would not be available in the RDP entry's corresponding snapshot, and the process 700 would not copy the bit's corresponding page into the track 600.

In yet another aspect, the index of a bit in a bitmap that is set to '1' may be used to carry the retrieval of a page from a snapshot, as well as the storage of the page in a reconstituted track. Specifically, the index may be used to determine the offset from which the page is retrieved, as well as the offset where the page is stored. For example, when a bit in a bitmap is set to '1', the index of the bit may be used to (i) determine the offset of the bit's page in the RDP entry's corresponding snapshot, and (ii) determine the offset at which the bit's page needs to be stored in the reconstituted track 600. In the example of RDP entry 720, because only one bit is set to '1', the offset of the bit's corresponding page may be determined to equal the value of pointer 722. In the example, of RDP entry 730, because 3 bits are set to '1', the offset for page 603 (which corresponds to bit 743) may be determined by calculating the sum of the pointer 732 and the product of (3-1) and the page size. In this case, (3-1) is the index of bit 743 among only the bits in bitmap 740 that are set to '1'. By contrast, the offset in track 600 where the contents of page 603 need to be stored may be determined by adding (3-1)*page_size to the offset of track 600, where (3-1) is the index of bit 743 among all bits in bitmap 740. In other words, the index of any bit (in the bit's bitmap) may be used to derive the location in a snapshot from which the bit's respective page can be retrieved, as well as the offset in a reconstituted track where the bit's respective page needs to be stored. In the example of bitmap 710, the index of bit 712 among the bits in bitmap 710 that are set to '1' is zero, whereas the index of bit 712 among all bits in bitmap 710 is one.

Figure 8:
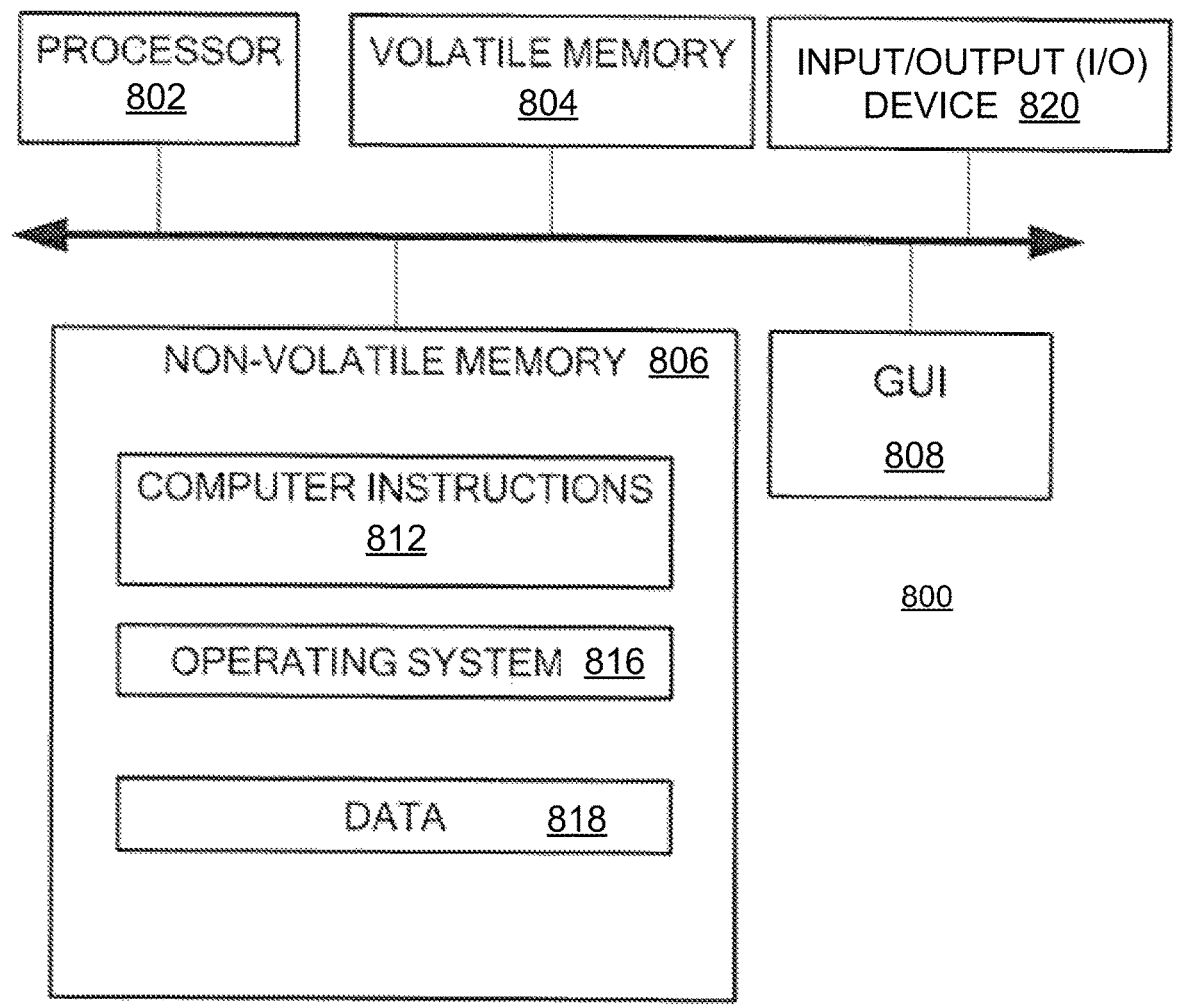
FIG. 8 is a diagram of an example of a computing device, according to aspects of the disclosure.

Referring to FIG. 8, in some embodiments, a computing device 800 may include processor 802, volatile memory 804 (e.g., RAM), non-volatile memory 806 (e.g., a hard disk drive, a solid-state drive such as a flash drive, a hybrid magnetic and solid-state drive, etc.), graphical user interface (GUI) 808 (e.g., a touchscreen, a display, and so forth) and input/output (I/O) device 820 (e.g., a mouse, a keyboard, etc.). Non-volatile memory 806 stores computer instructions 812, an operating system 816 and data 818 such that, for example, the computer instructions 812 are executed by the processor 802 out of volatile memory 804. Program code may be applied to data entered using an input device of GUI 808 or received from I/O device 820.

FIGS. 1-8 are provided as an example only. According to the present disclosure, each of the processes 300A-C. 400A-C, and 700 may be performed by any suitable type of computing device, such as a management system that is part of the storage system 110 and/or a storage processor. Additionally or alternatively, any of the processes 300A-C. 400A-C, and 700 may be performed by the computing device, such as the computing device 800. The snapshots of volume 202 may be stored at any suitable storage location, such as in the storage devices 114 or elsewhere. As used throughout the disclosure, and when permitted by context, the term "entry" means "data structure" or "a portion of a data structure". Although the present disclosure describes the tracks of volume 202 as being composed of pages, it will be understood that the tracks may be divided into a different type of track portions. According to the present disclosure, an entry is said to correspond to a track, if the entry includes an offset and/or another identifier of the track. According to the present disclosure, an entry is set to map a track to a snapshot of the track, if the entry includes an identifier of a physical or logical location where the track snapshot of the track is stored and/or an identifier of another entry that can be used to retrieve the identifier of the physical or logical location. In this regard, the term "map" may refer to either of direct mapping or indirect mapping. The phrase "copy of a track" may refer to either a complete or incomplete copy of the track. According to the present disclosure, an entry that points to a snapshot of a track that is part of a volume snapshot, can also be regarded as pointing to the volume itself.

In some embodiments, the term "I/O request" or simply "I/O" may be used to refer to an input or output request. In some embodiments, an I/O request may refer to a data read or write request. At least some of the steps discussed with respect to FIGS. 1-8 may be performed in parallel, in a different order, or altogether omitted. As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. The phrase "memory space of a guest operating system" may refer to volatile or non-volatile memory which the guest operating system (or applications running within the guest operating system) is allowed to access.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard. (1/23)

It will be further understood that various changes in the details, materials, and arrangements of the parts which have been described and illustrated in order to explain the nature of the claimed invention might be made by those skilled in the art without departing from the scope of the following claims.

The invention claimed is:

1. A method for reconstituting a data storage track of a volume, the method comprising:
   initializing a reconstituted data storage track that includes a plurality of pages;
   identifying a first type-1 data structure that corresponds to the data storage track and a first snapshot of the volume, the first type-1 data structure including a first bitmap, the first bitmap including a first plurality of bits, each of the first plurality of bits corresponding to a different page of the data storage track, each of the first plurality of bits being arranged to indicate whether the bit's corresponding page is present in the first snapshot;
   retrieving, from the first snapshot, one or more pages of the data storage track that correspond to bits in the first bitmap that are set to a predetermined value, and storing the pages that are retrieved from the first snapshot in the reconstituted data storage track;
   retrieving one or more additional pages of the data storage track that correspond to bits in the first bitmap that are set to a value other than the predetermined value, and storing the one or more additional pages in the reconstituted data storage track, each of the one or more additional pages being retrieved from either the volume itself or one or more other snapshots of the volume; and
   returning the reconstituted data storage track after the reconstituted data storage track is complete, wherein the reconstituted data storage track is complete when each of the plurality of pages of the reconstituted data storage track is written with data that is obtained from either a snapshot of the volume or the volume itself,
   wherein retrieving any of the one or more additional pages of the data storage track includes identifying a second type-1 data structure and applying a second bitmap that is part of the second type-1 data structure to retrieve at least one of the additional pages of the data storage track,
   wherein the second bitmap includes a second plurality of bits, the bits in the second plurality of bits corresponding to different pages in the storage track, each of the second plurality of bits being arranged to indicate whether the bit's corresponding page is present in a second snapshot, and
   wherein the second type-1 data structure is identified by: (i) retrieving from the first type-1 data structure an identifier of a first type-2 data structure, (ii) retrieving from the first type-2 data structure a pointer to a virtual reference table (VRT) entry, and (iii) retrieving from the VRT entry a pointer to the second type-1 data structure, the first type-2 data structure being configured to map an offset of the data storage track to the VRT entry, the VRT entry including information that indicates a physical location where the data storage track is stored, the VRT entry being arranged to map, to the physical location, multiple type-2 data structures that correspond to different data storage tracks.

2. The method of claim 1, wherein none of the plurality of pages of the reconstituted data storage track is written twice in a period starting when the reconstituted data storage track is initialized and ending when the reconstituted data storage track is completed.

3. The method of claim 1, wherein the first type-1 data structure includes an entry in a Replication Data Pointer (RDP) table.

4. The method of claim 1, wherein retrieving any of the one or more additional pages of the data storage track includes:
   identifying bits in the second bitmap that are set to the predetermined value and have positions in the second bitmap that are different from the positions of the bits in the first bitmap that are set to the predetermined value,
   retrieving, from the second snapshot, respective pages of the data storage track that correspond to the identified bits in the second bitmap, and storing, in the reconstituted data storage track, the respective pages of the data storage track that correspond to the identified bits in the second bitmap.

5. The method of claim 1, wherein each of the first type-1 data structure and the second type-1 data structure includes different respective entries in a Replication Data Pointer (RDP) table, and the first type-2 data structure includes an entry in a direct image lookup (DIL) table, the DIL table corresponding to the first snapshot.

6. The method of claim 1, wherein retrieving any of the one or more additional pages of the data storage track includes:
   detecting that all remaining pages of the data storage track are required to be retrieved from the volume itself, all remaining pages of the data storage track including those pages of the data storage track which have not been yet copied from a snapshot of the volume to the reconstituted data storage track,
   retrieving all remaining pages of the data storage track from the volume; and
   storing all remaining pages of the data storage track in the reconstituted data storage track.

7. The method of claim 6, wherein detecting that all remaining pages of the data storage track are required to be retrieved from the volume includes retrieving from the second type-1 data structure an identifier of a second type-2 data structure, and applying the second type-2 data structure to retrieve an identifier corresponding to the volume.

8. The method of claim 7, wherein the first type-1 data structure, the second type-1 data structure, and the third type-1 data structure include entries in a Replication Data Pointer (RDP) table, and the first type-2 data structure and the second type-2 data structure include entries in a direct image lookup (DIL) table, the DIL table corresponding to the volume.

9. A system comprising:
a memory; and
at least one processor that is operatively coupled to the memory, the at least one processor being configured to perform the operations of:
initializing a reconstituted data storage track that includes a plurality of pages;
identifying a first type-1 data structure that corresponds to a data storage track in a volume and a first snapshot of the volume, the first type-1 data structure including a first bitmap, the first bitmap including a first plurality of bits, each of the first plurality of bits corresponding to a different page of the data storage track, each of the first plurality of bits being arranged to indicate whether the bit's corresponding page is present in the first snapshot;
retrieving, from the first snapshot, one or more pages of the data storage track that correspond to bits in the first bitmap that are set to a predetermined value, and storing the pages that are retrieved from the first snapshot in the reconstituted data storage track;
retrieving one or more additional pages of the data storage track that correspond to bits in the first bitmap that are set to a value other than the predetermined value, and storing the one or more additional pages in the reconstituted data storage track, each of the one or more additional pages being retrieved from either the volume itself or one or more other snapshots of the volume; and
returning the reconstituted data storage track after the reconstituted data storage track is complete, wherein the reconstituted data storage track is complete when each of the plurality of pages of the reconstituted data storage track is written with data that is obtained from either a snapshot of the volume or the volume itself,
wherein retrieving any of the one or more additional pages of the data storage track includes identifying a second type-1 data structure and applying a second bitmap that is part of the second type-1 data structure to retrieve at least one of the additional pages of the data storage track,
wherein the second bitmap includes a second plurality of bits, the bits in the second plurality of bits corresponding to different pages in the storage track, each of the second plurality of bits being arranged to indicate whether the bit's corresponding page is present in a second snapshot, and
wherein the second type-1 data structure is identified by: (i) retrieving from the first type-1 data structure an identifier of a first type-2 data structure, (ii) retrieving from the first type-2 data structure a pointer to a virtual reference table (VRT) entry, and (iii) retrieving from the VRT entry a pointer to the second type-1 data structure, the first type-2 data structure being configured to map an offset of the data storage track to the VRT entry, the VRT entry including information that indicates a physical location where the data storage track is stored, the VRT entry being arranged to map, to the physical location, multiple type-2 data structures that correspond to different data storage tracks.

10. The system of claim 9, wherein none of the plurality of pages of the reconstituted data storage track is written twice in a period starting when the reconstituted data storage track is initialized and ending when the reconstituted data storage track is completed.

11. The system of claim 9, wherein the first type-1 data structure includes an entry in a Replication Data Pointer (RDP) table, and the data storage track includes a storage track.

12. The system of claim 9, wherein retrieving any of the one or more additional pages of the data storage track includes:
identifying bits in the second bitmap that are set to the predetermined value and have positions in the second bitmap that are different from the positions of the bits in the first bitmap that are set to the predetermined value,
retrieving, from the second snapshot, respective pages of the data storage track that correspond to the identified bits in the second bitmap, and storing, in the reconstituted data storage track, the respective pages of the data storage track that correspond to the identified bits in the second bitmap.

13. The system of claim 9, wherein each of the first type-1 data structure and the second type-1 data structure includes different respective entries in a Replication Data Pointer (RDP) table, and the first type-2 data structure includes an entry in a direct image lookup (DIL) table, the DIL table corresponding to the first snapshot.

14. The system of claim 9, wherein retrieving any of the one or more additional pages of the data storage track includes:
detecting that all remaining pages of the data storage track are required to be retrieved from the volume itself, all remaining pages of the data storage track including those pages of the data storage track which have not been yet copied from a snapshot of the volume to the reconstituted data storage track,
retrieving all remaining pages of the data storage track from the volume; and
storing all remaining pages of the data storage track in the reconstituted data storage track.

15. The system of claim 14, wherein detecting that all remaining pages of the data storage track are required to be retrieved from the volume includes retrieving from the second type-1 data structure an identifier of a second type-2 data structure, and applying the second type-2 data structure to retrieve an identifier corresponding to the volume.

16. The system of claim 15, wherein the first type-1 data structure, the second type-1 data structure, and the third type-1 data structure include entries in a Replication Data Pointer (RDP) table, and the first type-2 data structure and the second type-2 data structure include entries in a direct image lookup (DIL) table, the DIL table corresponding to the volume.

17. A non-transitory computer-readable medium storing one or more processor-executable instructions, which, when executed by at least one processor, cause the at least one processor to perform the operations of:
initializing a reconstituted data storage track that includes a plurality of pages;
identifying a first type-1 data structure that corresponds to a data storage track in a volume and a first snapshot of the volume, the first type-1 data structure including a first bitmap, the first bitmap including a first plurality of bits, each of the first plurality of bits corresponding to a different page of the data storage track, each of the first plurality of bits being arranged to indicate whether the bit's corresponding page is present in the first snapshot;

retrieving, from the first snapshot, one or more pages of the data storage track that correspond to bits in the first bitmap that are set to a predetermined value, and storing the pages that are retrieved from the first snapshot in the reconstituted data storage track;

retrieving one or more additional pages of the data storage track that correspond to bits in the first bitmap that are set to a value other than the predetermined value, and storing the one or more additional pages in the reconstituted data storage track, each of the one or more additional pages being retrieved from either the volume itself or one or more other snapshots of the volume; and returning the reconstituted data storage track after the reconstituted data storage track is complete, wherein the reconstituted data storage track is complete when each of the plurality of pages of the reconstituted data storage track is written with data that is obtained from either a snapshot of the volume or the volume itself, wherein retrieving the one or more additional pages of the data storage track includes identifying a second type-1 data structure and applying a second bitmap that is part of the second type-1 data structure to retrieve at least one of the additional pages of the data storage track, wherein the second bitmap includes a second plurality of bits, the bits in the second plurality of bits corresponding to different pages in the storage track, each of the second plurality of bits being arranged to indicate whether the bit's corresponding page is present in a second snapshot, and wherein the second type-1 data structure is identified by: (i) retrieving from the first type-1 data structure an identifier of a type-2 data structure, (ii) retrieving from the type-2 data structure a pointer to a virtual reference table (VRT) entry, and (iii) retrieving from the VRT entry a pointer to the second type-1 data structure, the first type-2 data structure being configured to map an offset of the data storage track to the VRT entry, the VRT entry including information that indicates a physical location where the data storage track is stored, the VRT entry being arranged to map, to the physical location, multiple type-2 data structures that correspond to different data storage tracks.

18. The non-transitory computer-readable medium of claim 17, wherein none of the plurality of pages of the reconstituted data storage track is written twice in a period starting when the reconstituted data storage track is initialized and ending when the reconstituted data storage track is completed.

* * * * *